Dec. 12, 1967  A. A. STEPHENS  3,357,685
BATTERY-OPERATED STIRRING UNIT FOR SAUCE PANS AND THE LIKE
Filed June 28, 1966  2 Sheets-Sheet 1

INVENTOR.
Anait A. Stephens

BY

ATTORNEYS

Dec. 12, 1967     A. A. STEPHENS     3,357,685
BATTERY-OPERATED STIRRING UNIT FOR SAUCE PANS AND THE LIKE
Filed June 28, 1966     2 Sheets-Sheet 2
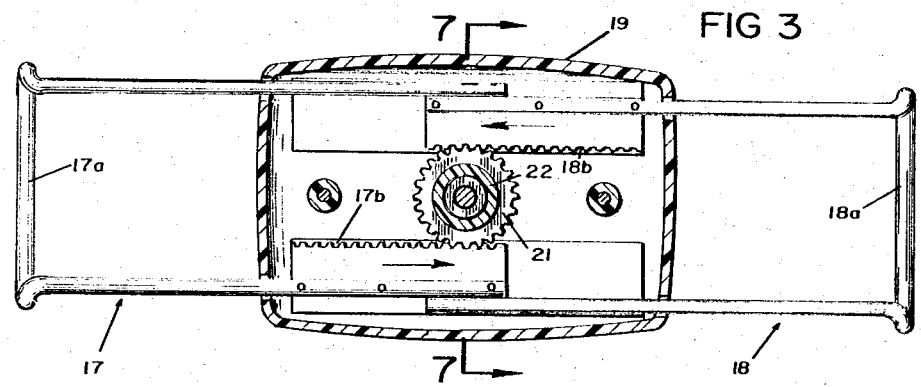
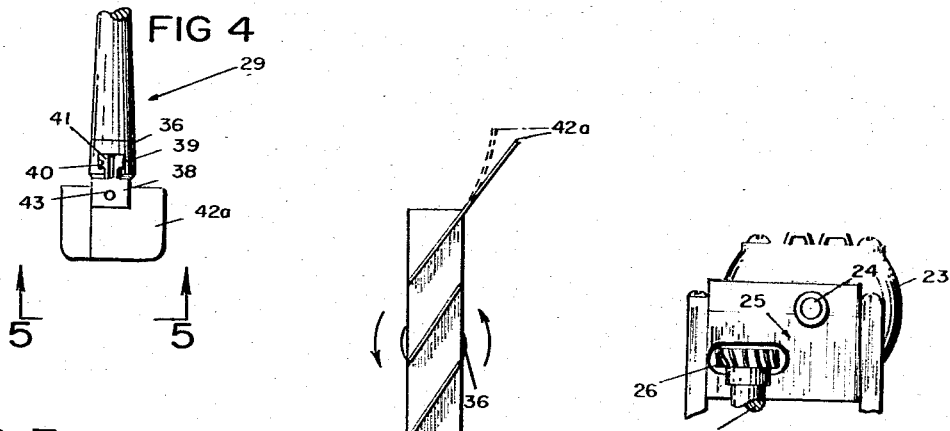
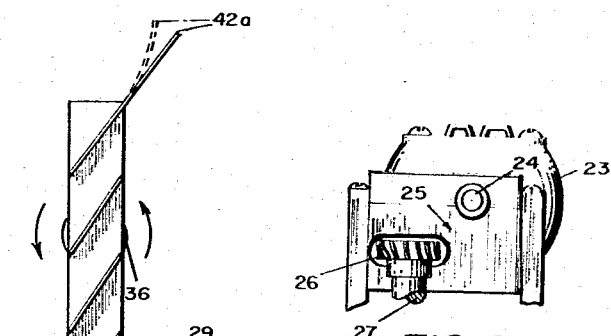
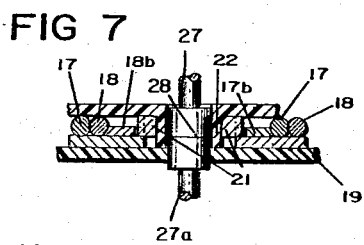
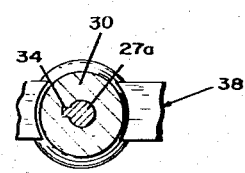
INVENTOR.
Anait A. Stephens
BY
ATTORNEY

United States Patent Office 3,357,685
Patented Dec. 12, 1967

3,357,685
BATTERY-OPERATED STIRRING UNIT FOR SAUCE PANS AND THE LIKE
Anait A. Stephens, Redondo Beach, Calif. (410 Martin Lane, Beverly Hills, Calif. 90210)
Filed June 28, 1966, Ser. No. 561,181
2 Claims. (Cl. 259—122)

ABSTRACT OF THE DISCLOSURE

A stirring unit for sauce pans and the like, having a battery operated, vertical stirring shaft carrying an elongated, transversely extending stirring element at its lower end. The unit is supported on the rim of a sauce pan by a pair of oppositely directed, telescoping yokes which are projectible and retractible in opposite directions, perpendicular to the axis of the shaft, and are interconnected by a rack and pinion mechanism for simultaneous movement to accommodate varying sauce pan rim sizes. The stirring element is slidably supported on the end of the shaft by frictional means to permit and maintain a selected longitudinal adjustment thereof on the shaft.

---

This invention relates to automatic stirring devices, and consists more particularly in new and useful improvements in a battery-operated stirring unit for use with sauce pans and the like.

In the preparation of puddings, sauces, gravies, etc., the ingredients are usually placed in a sauce pan or other utensil and cooked for the required time, generally from six to ten minutes for thickening, during which period they must be constantly stirred to avoid scorching, and they must also be checked frequently to prevent boiling over. All of this is time-consuming and tedious for the cook, and unless extreme care is taken, the results are unsatisfactory.

It is the primary object of this invention to provide a stirring unit for cooking utensils, including a battery-operated stirring device, designed to constantly stir the ingredients in the utensil at the desired speed to avoid scorching.

Another object of the invention is to provide a stirring unit which is supported on the top rim of a sauce pan or the like, and is adjustable for use with utensils of varying diameters and depths.

Another object is to provide a stirring unit having a stirring blade designed to substantially conform to the contour of the lower portion of the sauce pan, and is supported for automatic vertical adjustment to accommodate varying depths of sauce pans.

Still another object of the invention is to provide a stirring unit wherein the batteries and battery-operated motor are sealed in a housing as protection against the entrance of vapors or the materials being processed.

Although various cooking utensils, such as mixing bowls, as well as portable stirring devices, are electrically operated, they require electrical cord extensions which are plugged into electrical outlets, thus presenting a hazard when used with a bowl or sauce pan placed on a gas or electric heating element. With these devices, particular care is required to avoid subjecting the extension cord to the heat of the cooking units. It is therefore a further object of this invention to provide a battery-operated stirring device which requires no electric cords or other connecting means.

With the above and other objects in view which will appear as the description proceeds, the invention consists in the novel features herein set forth, illustrated in the accompanying drawings, and more particularly pointed out in the appended claims.

Referring to the drawings in which numerals of like character designate similar parts throughout the several views:

FIG. 3 is a sectional view taken on line 3—3 of FIG. 1;

FIG. 4 is a fragmentary elevational view of the stirring rod and blades;

FIG. 5 is a bottom view of the stirring blade assembly, taken on line 5—5 of FIG. 4;

FIG. 6 is a detailed sectional view taken on line 6—6 of FIG. 2;

FIG. 7 is a detailed sectional view taken on line 7—7 of FIG. 3; and

FIG. 8 is a sectional view taken on line 8—8 of FIG. 1.

Figure 1:
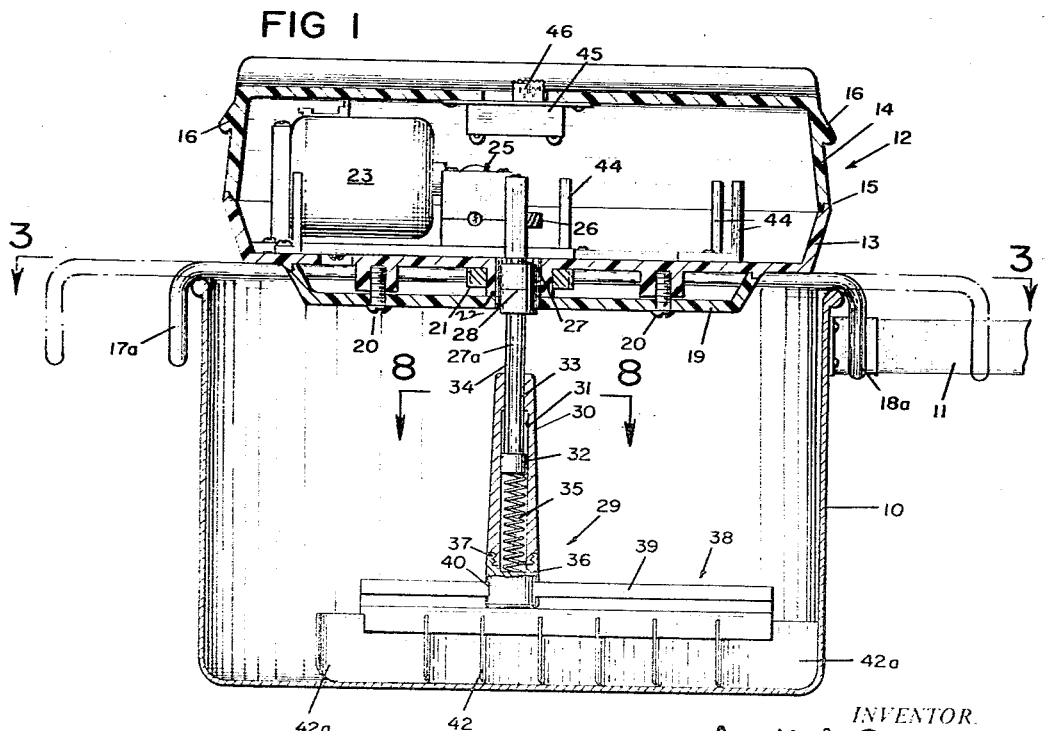
FIG. 1 is a vertical sectional view, showing the stirring unit of the present invention in operative position on a sauce pan.

In the drawings, referring first to FIG. 1, 10 represents a more or less conventional sauce pan having the usual handle 11 secured to and projecting laterally from one side wall. The stirring unit of the present invention is generally designated by the numeral 12 and comprises a housing, preferably formed of suitable plastic, having the required rigidity for adequate support. The housing comprises a base section 13 and a cover section 14, the meeting edges of which are shaped to provide complementary snap-engaging rims 15 which frictionally hold the two sections of the housing together. To facilitate removal of the cover section 14, gripping ribs 16 may be provided on the outer surfaces of one or more of its walls.

The housing 12 is supported on the upper rim of the sauce pan or the like 10, by means of a pair of oppositely directed, substantially U-shaped yokes 17 and 18. The legs of the respective yokes are arranged in telescoping relation, as best seen in FIG. 3, and their outer ends are turned downwardly at substantially right angles as at 17a and 18a respectively, to overhang and engage the rim of the sauce pan 10. The telescoping legs of the yokes are supported for sliding longitudinal movement in a bottom enclosure 19 of concave shape, which is secured to the undersurface of the housing base 13 by suitable screws and bosses 20. One leg of each of the yokes 17 and 18 is provided with a rack bar 17b and 18b respectively, the teeth of which are inwardly directed for engagement with a common pinion gear 21, rotatably supported as at 22, whereby, upon the extension or retraction of either yoke, the opposite yoke is correspondingly actuated to adjust the pair of yokes in conformity with the diameter of the sauce pan 10.

Within the housing 12 and suitably supported by the base 13, is a battery-operated motor 23 of any conventional design, and disposed with its driveshaft 24 directed horizontally inwardly in the housing. By any suitable speed-reducing gear train, generally indicated at 25, the driveshaft 24 is operatively connected to a driven gear 26, fixed to the upper extremity of a stirring shaft 27 which depends from a central point through the bottom of the housing 12. The shaft 27 is made in two sections, the lower section 27a of which supports the stirring blade assembly, as will later appear, and the two shaft sections are detachably connected by any conventional chuck means such as 28.

The stirring assembly is generally indicated at 29 and comprises a vertically disposed, tubular neck 30 having a spring receiving chamber 31 to accommodate a plunger 32, carried at the lower extremity of the shaft section 27a. A central bore 33 at the upper end of the neck 30, slidably receives the shaft 27a which is preferably provided with the longitudinally extending rib 34 on one side, adapted to engage a corresponding recess communicating with the bore 33, in the manner of a key. A coil spring 35 is interposed between the bottom of the plunger 32 and the closure cap 36 which is removably attached to the lower end of the neck 30 by means of complementary threads 37. Thus, the neck 30 is normally biased downwardly by the spring 36, and the rotary motion of the shaft 27a is transmitted to the neck by means of the rib 34.

The stirring component comprises a cross-bar 38 which is slidably supported for longitudinal adjustment with respect to the closure cap 36, by a pair of parallel guide rails 39, slidably received in complementary guide grooves 40 in the closure cap 36. Preferably, the upper edge of the cross-bar 38 is provided with a longitudinal slot 41 between the guide rails 39, which affords a certain degree of transverse resilience to the opposed guide rails, so that they engage the guide grooves 40 under sufficient outward tension, to frictionally maintain a selected longitudinal adjustment of the cross-bar 38 in a plane perpendicular to the axis of the neck 30.

The underside of the cross-bar 38 is diagonally slotted to receive a series of stirring blades 42, preferably formed of suitable plastic material, having the necessary rigidity, but possessing a certain degree of flexibility to affect the desired stirring action. The end blades 42a are preferably longer than the intermediate blades to insure stirring contact and flexible adjustment to the various corner radii in the pans with which the unit is used. Also, the lower edges of the blades at their extremities are preferably curved in profile to facilitate the proper stirring or scraping contact. The blades may be secured in their slots by any convenient means, as at 43 (FIG. 4).

Figure 2:
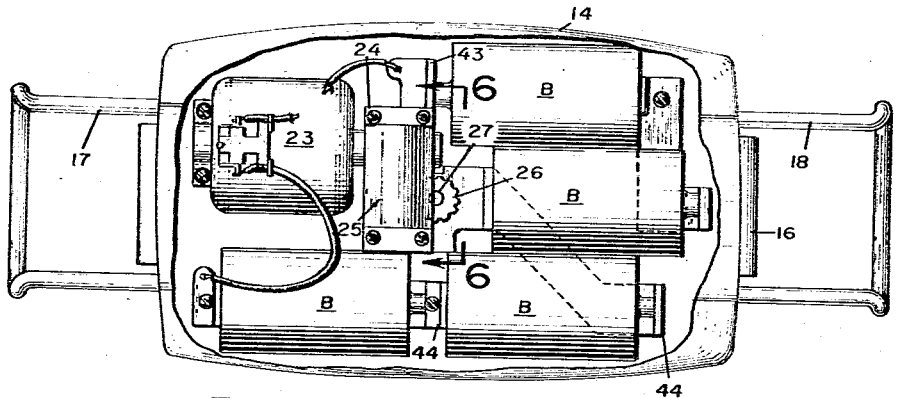
FIG. 2 is a top plan view of the stirring unit with the cover partially broken away to illustrate the interior.

Power for operating the motor 23 is derived from one or a series of small batteries B, four of such batteries being shown in FIG. 2. These batteries are disposed in the housing 12, and are respectively held in place by opposed contact posts 44 which are electrically connected to the motor in the usual manner. A conventional switch 45 having a push-button 46, is electrically connected to the system for controlling the operation of the motor 23.

In operation, the unit is placed on the top of the sauce pan 10 and the yokes 17 and 18 are adjusted inwardly or outwardly to the diameter of the sauce pan. Preferably, one of the downturned ends 17a or 18a is disposed adjacent the handle 11 of the sauce pan so that during the stirring operation, relative rotary movement of the unit with respect to the sauce pan is prevented. The spring biasing of the stirring assembly 29, through the coil spring 35, permits automatic vertical adjustment to suit the depth of the sauce pan 10 so that the blades 42 are maintained in stirring contact with the bottom and adjacent edges of the sauce pan.

Longitudinal adjustment of the cross-bar 38 in the neck closure 36, is effected by simply sliding the cross-bar in the grooves 40 until the end blade 32a at one extremity of the assembly engages the inner wall of the sauce pan. The selected adjustment of the cross-bar is frictionally maintained by the outwardly biased guide rails 39 in the slots 40.

It will be apparent that the adjustable features of this device readily adapt it for use with sauce pans of various diameters and depths, and the blades are designed to effect a scraping action on the bottom of the sauce pan in addition to a stirring action.

From the foregoing, it is believed that the invention may be readily understood by those skilled in the art without further description, it being borne in mind that numerous changes may be made in the details disclosed without departing from the spirit of the invention as set forth in the following claims.

I claim:
1. A battery-operated stirring unit for use with sauce pans or the like, comprising:
   a housing,
   a battery-operated motor in said housing,
   a stirring shaft depending through the bottom of said housing,
   a speed-reducing gear train operatively connecting said stirring shaft to the shaft of said motor,
   at least one battery in said housing electrically connected in circuit with said motor,
   a control switch in said circuit,
   an elongated stirring element,
   a connector at the lower end of said stirring shaft operatively supporting said stirring element,
   said connector including means enabling the longitudinal adjustment of said stirring element in a direction substantially perpendicular to the axis of said stirring shaft to accommodate varying sauce pan diameters,
   adjustable means for supporting said housing on the upper rim of a sauce pan, comprising a pair of oppositely directed, telescoping yokes which are respectively projectible and retractible in a direction perpendicular to the axis of said stirring shaft,
   said telescoping yokes being interconnected by a rack and pinion mechanism for simultaneous adjusting movement in opposite directions, to accommodate varying sauce pan rim diameters.

2. A stirring unit as claimed in claim 1, wherein said stirring element comprises a cross bar having a series of stirring blades spaced longitudinally on and depending therefrom, the upper edge of said cross bar forming a pair of oppositely, outwardly directed, longitudinally extending guide rails on opposite sides of said cross bar, said rails being separated by an intervening longitudinally extending slot, providing transverse resilience to said guide rails, said connector having a vertical, transverse slot at its lower end, contoured to frictionally engage said guide rails under tension to thereby maintain a selected longitudinal adjustment of the cross bar with respect to said connector.

References Cited
UNITED STATES PATENTS

| | | | |
|---|---|---|---|
| 817,400 | 4/1906 | Stanley | 259—108 |
| 2,042,176 | 5/1936 | Hausman | 259—122 |
| 2,805,843 | 9/1957 | Block | 259—135 |
| 3,011,768 | 12/1961 | Clark | 259—135 X |
| 3,175,808 | 3/1965 | Dedoes | 259—107 |
| 3,251,581 | 5/1966 | Jensen | 259—135 X |

FOREIGN PATENTS 234,607   6/1925   Great Britain.

WILLIAM I. PRICE, *Primary Examiner.*